United States Patent [19]
Melendrez

[11] Patent Number: 5,271,369
[45] Date of Patent: * Dec. 21, 1993

[54] FUEL CONDITIONING SYSTEM FOR INTERNAL COMBUSTION ENGINES

[75] Inventor: Julian B. Melendrez, 421 NW. 76th St., Vancouver, Wash. 98665

[73] Assignees: Julian B. Melendrez; Julie A. Burns, Vancouver, Wash.

[*] Notice: The portion of the term of this patent subsequent to Jan. 14, 2009 has been disclaimed.

[21] Appl. No.: 820,410

[22] Filed: Jan. 13, 1992

Related U.S. Application Data

[63] Continuation-in-part of Ser. No. 558,690, Jul. 26, 1990, Pat. No. 5,080,080.

[51] Int. Cl.$^5$ .............................................. F02B 75/00
[52] U.S. Cl. .................................................. 123/538
[58] Field of Search ............... 123/536, 537, 538, 539

[56] References Cited

U.S. PATENT DOCUMENTS

| | | | |
|---|---|---|---|
| 3,349,354 | 10/1967 | Miyata | 123/538 |
| 4,308,847 | 1/1982 | Ruizzo | 123/536 |
| 4,357,237 | 11/1982 | Sanderson | 123/590 |
| 4,461,262 | 7/1984 | Chow | 123/538 |
| 4,538,582 | 9/1985 | Wakuta | 123/538 |
| 4,568,901 | 2/1986 | Adam | 123/538 |
| 4,572,145 | 2/1986 | Mitchell et al. | 123/538 |
| 4,711,271 | 12/1987 | Weisenbarger et al. | 123/538 |
| 5,048,498 | 9/1991 | Cardan | 123/538 |
| 5,063,368 | 11/1991 | Ettehadieh | 123/538 |
| 5,080,080 | 1/1992 | Melendrez | 123/538 |
| 5,124,045 | 6/1992 | Janczak et al. | 123/538 |
| 5,129,382 | 7/1992 | Stamps et al. | 123/538 |
| 5,161,512 | 11/1992 | Adam et al. | 123/538 |

OTHER PUBLICATIONS

Hibben, Stuart G., "Magnetic Treatment of Water," *Informatics Incorporated*, AD-757 887 (Jan. 30, 1973).

*Primary Examiner*—Tony M. Argenbright
*Assistant Examiner*—M. Macy
*Attorney, Agent, or Firm*—Klarquist Sparkman Campbell Leigh & Whinston

[57] ABSTRACT

A method and apparatus to improve the fuel utilization of internal combustion engines by inducing a magnetic field in the fuel before it flows into a carburetor or fuel injector system. Aluminum or steel fittings connect a rubber fuel line between a fuel pump and a carburetor or fuel injection system of an internal combustion engine. A magnet assembly having one or more permanent magnets is secured against the fuel line so a preselected pole is in contact with the rubber fuel line. A rubber shield or wrap surrounds the magnet assembly and the portion of the fuel line in contact with the magnet assembly to shield the magnetic field about the fuel line. The one or more magnets direct a magnetic field toward the fuel line to induce a magnetic field into fuel flowing through the fuel line. The magnetic field induced in the flowing fuel is believed to ionize the hydrocarbon fuel to increase combustion efficiency, thus, increasing fuel economy and decreasing fuel emissions.

20 Claims, 7 Drawing Sheets

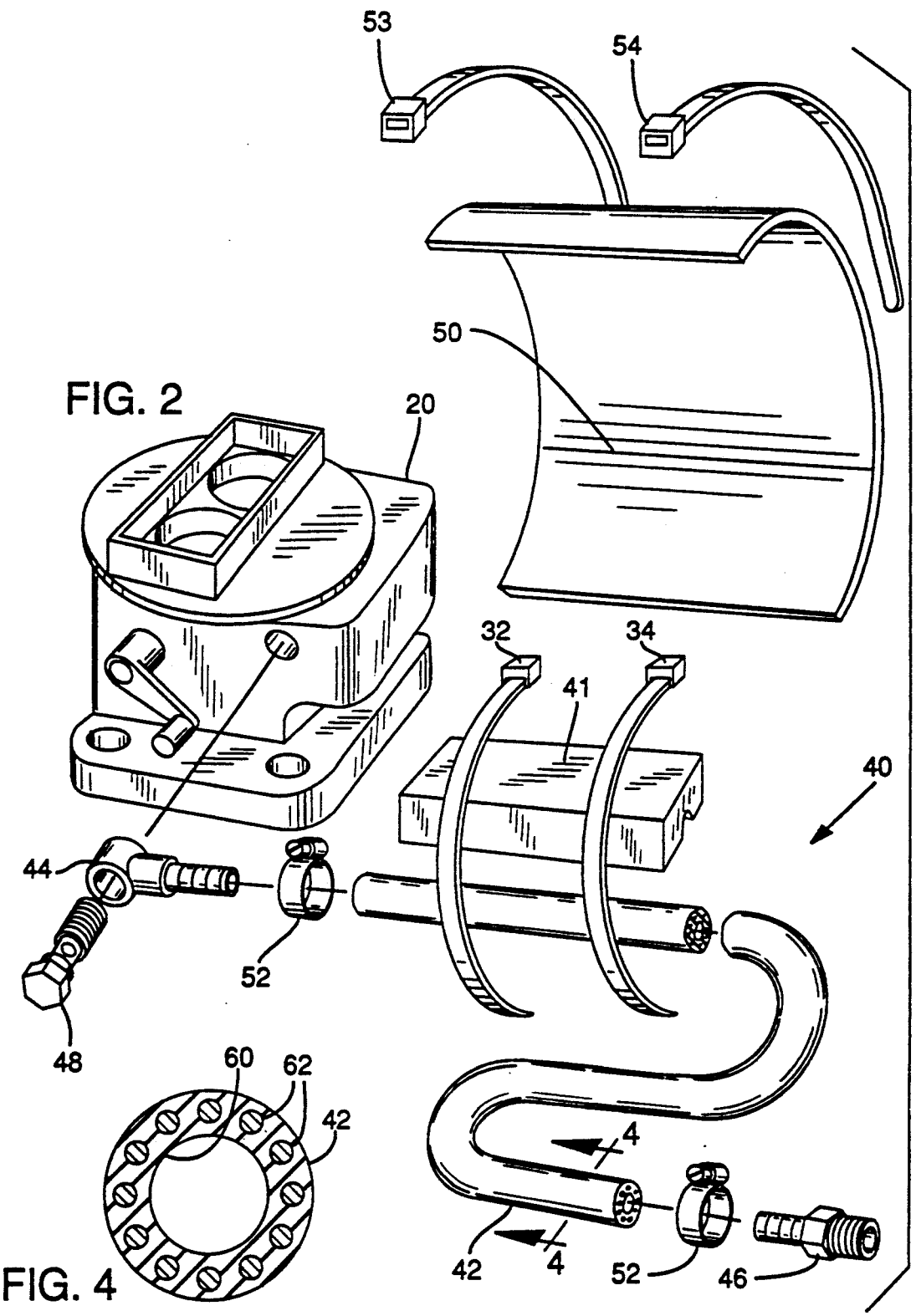

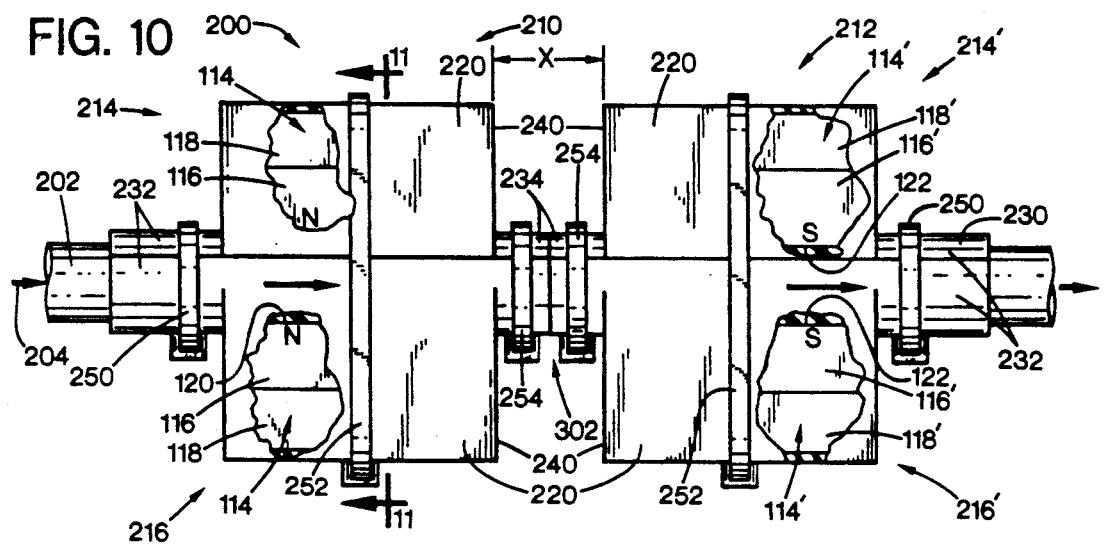
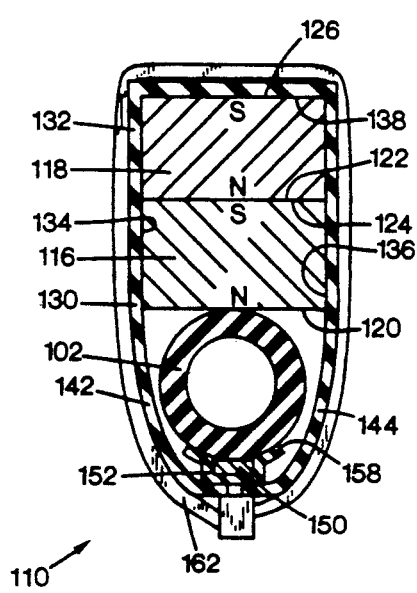
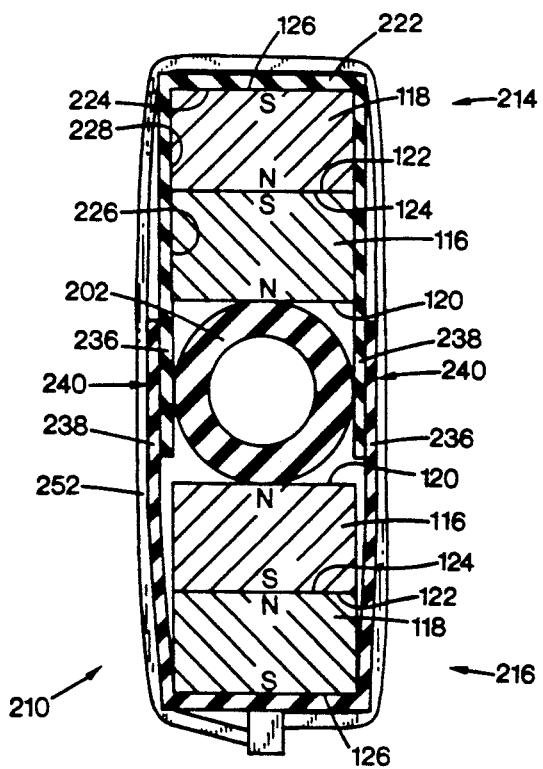

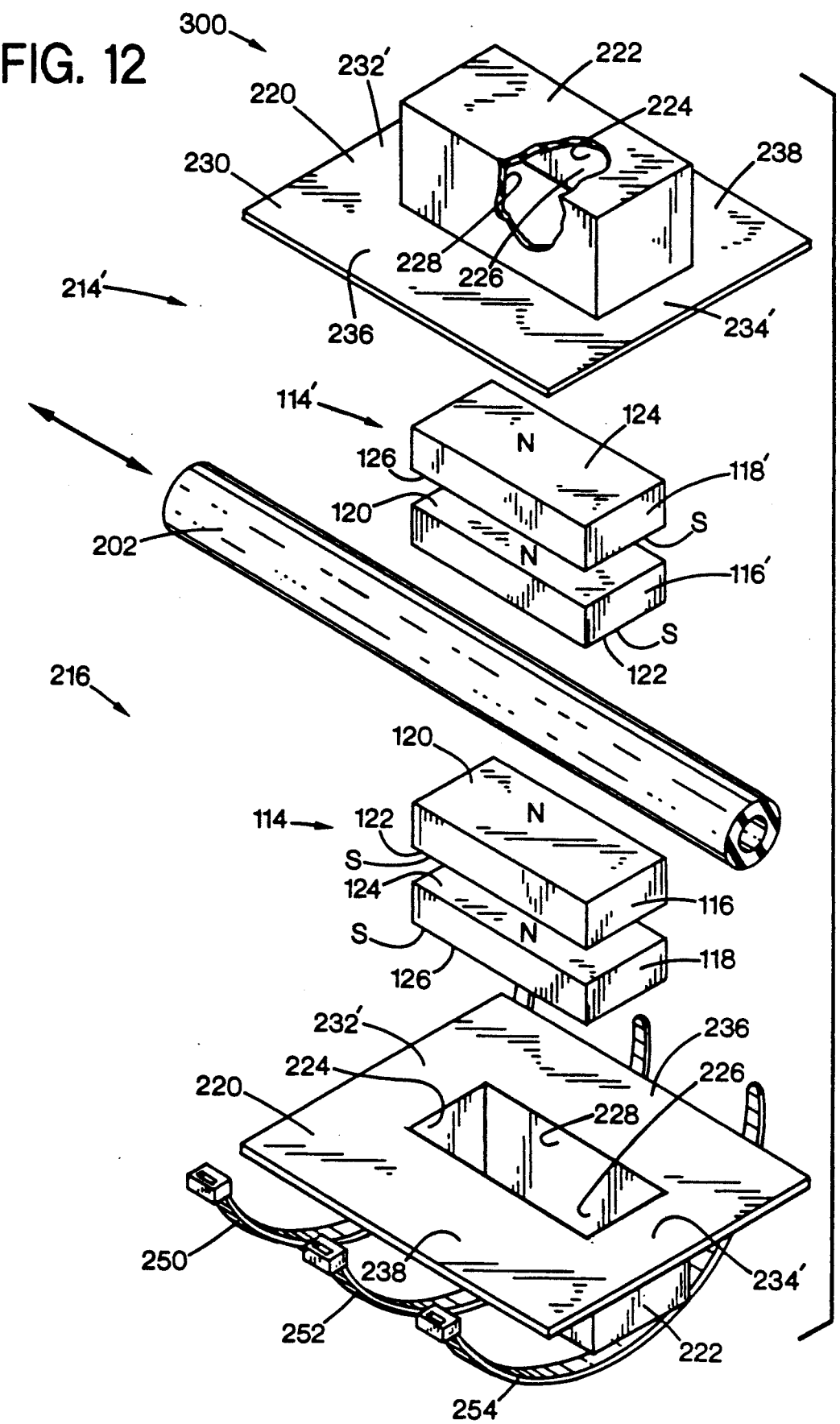

FUEL CONDITIONING SYSTEM FOR INTERNAL COMBUSTION ENGINES

This is a continuation-in-part of co-pending application Ser. No. 07/558,690, filed Jul. 26, 1990, granted U.S. Pat. No. 5,080,080 having a Jan. 14, 1992, issue date, and having the same inventor.

BACKGROUND OF THE INVENTION

The present invention relates generally to a system, including a method and an apparatus, to improve the fuel utilization of internal combustion engines, and more particularly to a fuel economy and emissions improvement apparatus, and a method of conditioning fuel by placing a permanent magnet about a rubber fuel line, then surrounding the magnet and the fuel line with a rubber material, to induce a magnetic field in fuel flowing in the fuel line.

In the past, permanent magnets have been attached to fuel lines on internal combustion engines to increase the fuel economy of these engines. The specific mechanism of how the magnets increase the fuel economy is not fully understood. It is believed that the magnetic field partially ionizes the fuel flowing in the fuel line to increase its affinity for oxygen, thus, producing more complete combustion of the fuel in the cylinders of the engine.

One system, described in U.S. Pat. No. 4,461,262 to Chow, has a first pair of magnets sandwiched about a fuel inlet line and a second pair of magnets sandwiched about a carburetor air intake. For each pair of magnets, Chow aligns like magnetic poles (e.g., both south poles) diametrically opposite from one another, with the north pole being located toward the carburetor mixing zone so both the fuel and the air first flow between the two south poles, then between the two north poles. Chow requires each pair of magnets to be located as close to the carburetor mixing zone as possible. Each of Chow's magnets are insulated with a nonmagnetic material or, if the magnets are not insulated, the fuel inlet line is surrounded by an insulator. To keep the magnets apart, Chow uses two diametrically opposed Neoprene hose spacers placed adjacent the fuel line and between the magnets. A hose clamp secures each pair of magnets in position by compressing the hose spacers to lock the magnets in place.

Another system, described in U.S. Pat. No. 4,572,145 to Mitchell, has a magnet embedded in the upper portion of a plastic body. The plastic body has a pair of legs defining an open groove therebetween which receives the fuel line. Two straps secure the fuel line within the groove. Mitchell's magnet is separated from the fuel line by a portion of the plastic body. The plastic body of Mitchell does not surround or shield the fuel line, but rather leaves the lower portion of fuel line exposed to the environment.

Another such magnet is marketed by H. K. Research and Development, 33491 Calle Miramar, San Juan Capsitrano, Calif., as a HK-12 Unit. The H. K. Research and Development magnet is affixed to a standard fuel line by means of nylon straps. Although these units tend to increase the fuel economy of the engine to which they are attached, it has been found that further increases in the fuel economy can be realized.

Thus, a need exists for an improved internal combustion engine fuel utilization system, including a fuel economy and emissions improvement apparatus, and a method of improving fuel utilization by inducing a magnetic field in fuel flowing in the fuel line, which is directed toward overcoming, and not susceptible to, the above limitations and disadvantages.

SUMMARY OF THE INVENTION

According to one aspect of the present invention, a large inside diameter rubber fuel line having no metal reinforcements transports fuel from an inlet side to an outlet side. An aluminum or steel fitting connects the inlet side of the fuel line to a fuel pump. Another an aluminum or steel fitting connects the outlet side of the fuel line to a carburetor or fuel injection system of an internal combustion engine. A magnet assembly having one or more permanent magnets is secured against the fuel line so a preselected particular pole is in contact with the rubber fuel line. A rubber wrap or molded rubber shield surrounds the magnet assembly and the portion of the fuel line in contact with the magnet assembly to shield the magnetic field about the fuel line. The one or more magnets direct a magnetic field toward the fuel line to induce a magnetic field into any fuel flowing through the fuel line.

In an illustrated embodiment, a focusing bar of a ferrous steel is secured against the fuel line in a substantially diametrically opposed position from the magnet assembly to focus the magnetic field. In another illustrated embodiment, the magnet assembly is located a preselected substantial distance from the carburetor or diesel cylinder, such as eighteen inches. In a further embodiment, a pair of magnet assemblies are secured side-by-side against the fuel line. The magnetic poles are positioned adjacent the fuel line with a north pole upstream of a south pole, so the flowing fuel first encounters a first magnetic field generated by the north pole, and then a second magnetic field generated by the south pole. In an additional embodiment, two double magnet assemblies are located side-by-side with the upstream double assembly having two diametrically opposed north poles and the downstream double assembly having two diametrically opposed south poles. Still another embodiment comprises a double magnet assembly having two diametrically opposed poles, one north and the other a south pole.

An overall object of the present invention is to provide an improved fuel conditioning device for improving the fuel utilization of an internal combustion engine.

Another object of the present invention is to improve the fuel economy and the fuel emissions of an internal combustion engine.

Yet another object of the present invention is to provide an improved method of conditioning the fuel flowing to an internal combustion engine.

An additional object of the invention is to shield and focus a magnetic field induced in a rubber fuel line to improve the utilization of fuel received by an internal combustion engine through the fuel line.

Still another object of the invention is to condition fuel flowing in a rubber fuel line using a magnetic field to provide more complete combustion of the fuel in an internal combustion engine.

The present invention relates to the above features and objects individually as well as collectively. These and other objects, features and advantages of the present invention will become apparent to those skilled in the art from the following description and drawings.

BRIEF DESCRIPTION OF THE DRAWINGS

FIG. 2 is an exploded perspective view of one form of a fuel conditioning apparatus of the present invention to improve fuel economy of an internal combustion engine;

FIG. 4 is a cross-sectional view of the rubber fuel line taken along lines 4—4 of FIG. 2;

FIG. 8 is a vertical cross-sectional view taken along lines 8—8 of FIG. 5;

FIG. 10 is a side elevational partially cut away view of another alternate form of a fuel conditioning apparatus of the present invention;

FIG. 11 is a cross-sectional elevational view of the apparatus of FIG. 10 taken along lines 11—11 thereof;

FIG. 12 is an exploded perspective partially cut away view of a further alternate form of a fuel conditioning apparatus of the present invention;

DETAILED DESCRIPTION OF THE PREFERRED EMBODIMENTS

Figure 1:
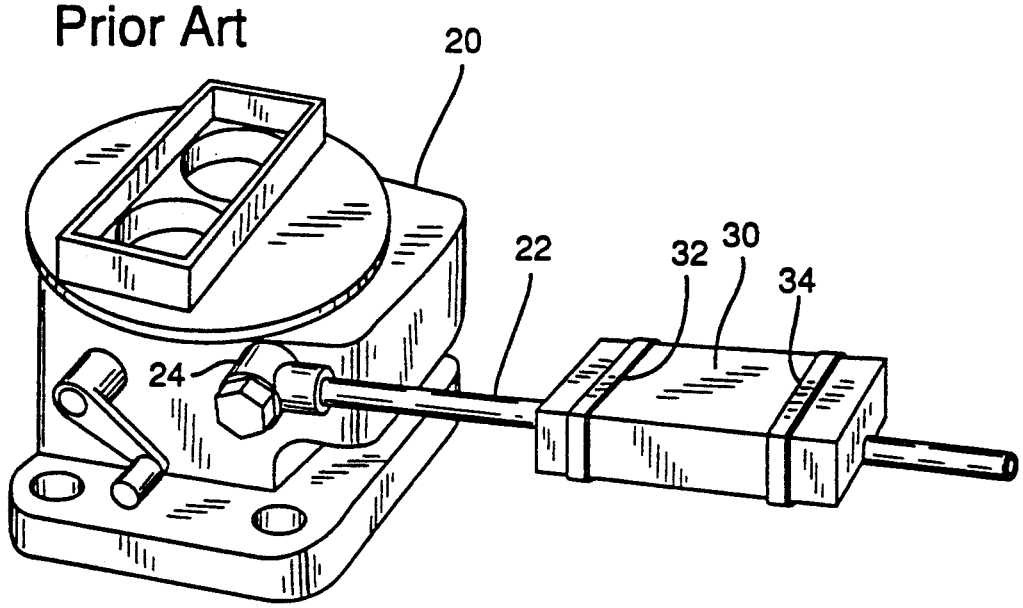
FIG. 1 is a perspective view of a prior art magnet attached to a fuel line of an internal combustion engine.

FIG. 1 shows a prior art system of subjecting fuel to a magnet field as it flows to a carburetor 20 of an internal combustion engine. The fuel flows through a metal fuel line 22 which terminates in a brass fitting 24. A magnet 30, such as produced by H.K. Research and Development, 33491 Calle Miramar, San Juan Capsitrano, Calif., and designated a HK-12 Unit is shown strapped to the fuel line 22 by nylon straps 32 and 34. The HK-12 magnet 30 is approximately 1" high and 3¼" square and produces approximately 940 gauss. This particular arrangement has been shown in increase the fuel mileage of diesel semi-trucks or tractors by approximately 12.8 percent as shown in Table 1. Table 1 shows a test on a series of diesel tractors without the HK-12 magnet assembly and with the HK-12 magnet assembly.

TABLE 1

| Tractor Number | Without Unit MPG | With Only HK-12 MPG | % Increase in MPG |
|---|---|---|---|
| 70 | 4.56 | 5.40 | 18.42 |
| 72 | 5.60 | 6.12 | 9.29 |
| 74 | 5.36 | 6.29 | 17.35 |
| 75 | 5.25 | 5.55 | 5.71 |
| 76 | 5.47 | 5.75 | 5.12 |
| 77 | 5.30 | 5.83 | 12.71 |
| 83 | 5.06 | 6.40 | 26.48 |
| 84 | 5.00 | 6.30 | 26.00 |
| 88 | 6.07 | 6.19 | 1.28 |
| 89 | 4.98 | 5.09 | 4.20 |
| 94 | 5.91 | 6.32 | 7.37 |
| 96 | 5.91 | 6.24 | 7.28 |
| 103 | 5.80 | 6.61 | 14.07 |
| 104 | 5.38 | 6.59 | 22.50 |
| 111 | 5.82 | 6.08 | 4.51 |
| 112 | 5.48 | 5.78 | 6.06 |
| 114 | 5.80 | 5.89 | 2.05 |
| 115 | 5.47 | 6.40 | 17.00 |
| 118 | 5.60 | 6.31 | 12.70 |
| 121 | 5.77 | 5.88 | 5.26 |
| 122 | 5.81 | 6.34 | 9.12 |
| 131 | 5.43 | 6.25 | 15.10 |
| 132 | 5.95 | 6.62 | 11.26 |
| 134 | 5.72 | 6.28 | 9.80 |
| 135 | 5.08 | 6.04 | 18.91 |
| 136 | 5.48 | 5.79 | 5.71 |
| 137 | 5.83 | 6.03 | 3.43 |
| 138 | 4.84 | 5.37 | 10.95 |
| 139 | 5.44 | 5.46 | 0.37 |
| 140 | 5.12 | 5.44 | 6.25 |
| 141 | 5.42 | 6.22 | 12.68 |
| 143 | 4.83 | 5.27 | 9.11 |
| 144 | 4.83 | 5.58 | 15.53 |
| 145 | 4.84 | 5.43 | 12.20 |
| 147 | 5.36 | 5.54 | 3.46 |
| 148 | 4.92 | 5.40 | 10.06 |
| 149 | 5.41 | 6.52 | 25.14 |
| 150 | 5.74 | 6.83 | 15.51 |
| 151 | 5.25 | 6.94 | 32.19 |
| 162 | 5.23 | 6.14 | 18.41 |
| 173 | 4.99 | 5.28 | 5.81 |
| 174 | 5.63 | 5.84 | 3.73 |
| 179 | 5.76 | 6.09 | 5.73 |
| 185 | 5.31 | 5.78 | 8.90 |
| 188 | 5.00 | 5.50 | 10.00 |
| 189 | 5.33 | 5.97 | 12.00 |
| 191 | 4.08 | 5.59 | 37.00 |
| 192 | 4.95 | 6.44 | 30.10 |
| 195 | 4.73 | 6.21 | 31.30 |
| 196 | 4.87 | 6.22 | 27.72 |
| 197 | 5.35 | 5.62 | 5.05 |
| 198 | 4.82 | 5.98 | 24.07 |
| 200 | 5.57 | 6.44 | 15.62 |
| 201 | 4.71 | 5.66 | 20.17 |
| 503 | 5.04 | 6.36 | 26.19 |
| Average | 5.31 | 6.00 | 12.82% |

The prior art magneto-hydrodynamic magnet unit 30 promotes improved burning of all hydrocarbon base fuels including gasoline, diesel, and propane. The magnet unit 30 is strapped to the fuel line 22 as close as possible to the carburetor 20 or fuel injection system. As fuel flows through the fuel line, it is influenced by a high intensity focused magnetic field which ionizes the fuel. This ionization process causes fuel hydrocarbons to exhibit a net positive molecular charge resulting in a hydrocarbon molecule that more readily bonds to the negative charged oxygen molecule. Magnetically influenced fuel dissolves carbon build up in carburetor jets, fuel injectors, and combustion chambers thereby helping to clean the engine. The resultant conditioned fuel burns more completely producing a higher BTU output, better fuel economy, more power, and reduced emissions.

In the past, it was felt that a higher magnetic field would increase this effect on the fuel. However, almost all fuel lines used today are either metal, plastic or steel reinforced. When the magnet was placed on these fuel lines, the magnetic force dissipated both up and down the fuel line from where the unit is placed. Within a few days the entire fuel line is magnetized but in a very weakened state. It was also found that some engines use brass fuel connectors on the fuel line. Brass, it has been found, totally negates the magnetic force. Also, metal surrounding the fuel line, such as the engine and other components, also attract the magnetic force from the unit and further dissipates the force. It has been found that by various improvements, the fuel mileage can be significantly increased by magneto-hydrodynamic effects.

Figure 3:
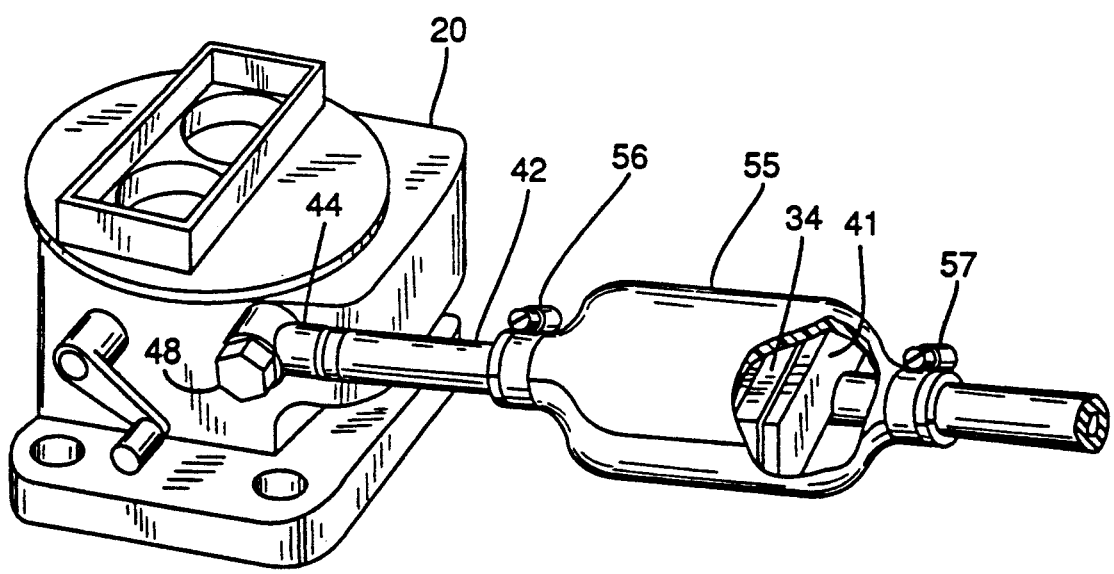
FIG. 3 is a partially cut away perspective view of the apparatus of FIG. 2 when assembled to a carburetor.

Significant increase in fuel economy has been realized by the improvements shown in FIG. 2 through FIG. 4. The first improvement is a fabric reinforced rubber fuel line assembly 40 having a rubber hose 42 such as a Parker 296-10¼" ID rubber fuel line hose for delivering fuel from an inlet end to an outlet end. This fuel line assembly 40 has an outlet fitting 44 made of steel or aluminum. Similarly, an aluminum or steel inlet fitting 46 is fitted to the inlet side of the fuel line assembly 40. A banjo nut 48 made of steel or aluminum is used to attach the fuel line 40 the carburetor 20. The key is that the fittings 44, 46, and 40 have no copper in these fitting such as is true with brass or copper fittings. The fuel line hose 42 is attached to the fittings 44 and 46 with non-metallic clamps 52.

A magnet assembly 41, in this case, designated a 5HD magnet, is strapped by means of nylon straps 32 and 34 to the rubber fuel line 42. The 5HD magnet 41 is approximately 5¼" long, 1½" wide, and 2" high and produces approximately 560 gauss. It has been found by experimentation that the field strength of magnet 41 should be between 500 gauss and 1,000 gauss. The increased length of this magnet induces the magnetic field over a longer portion of the fuel line 42, thus, increasing the length of time that the magnetic field is induced in the traveling fuel. The larger diameter of hose 42 compared to the size of conventional metal fuel lines also slows the travel of the fuel increasing the time that the magnetic field is exposed to the fuel. A sheet rubber wrap 50 being approximately 11½" square by ⅛" thick is wrapped about the magnet 41 and a portion of the fuel line 42 in contact with the magnet. This shield or rubber wrap 50 is held in place by two nylon straps 53 and 54.

It has been found that the rubber shield 50, when used with gasoline engines, can be reduced in thickness to approximately 1/16" while still maintaining its effectiveness. With these improvements, six diesel tractors were tested, similar to the method used in Table 1, with an increase in fuel mileage of 45 percent. This increase in fuel mileage is attributable to the fuel line being rubber, having a large ID 60 as shown in FIG. 4, and non-metallic reinforcement such as fabric fiber 62.

TABLE 2

| Tractor Number | Without Unit MPG | With 5HD Unit and Rubber Wrap MPG | % Increase in MPG |
|---|---|---|---|
| 71 | 3.52 | 4.92 | 40.07 |
| 82 | 5.00 | 7.28 | 45.60 |
| 142 | 3.79 | 5.49 | 44.85 |
| 180 | 4.06 | 6.22 | 53.20 |
| 184 | 4.22 | 6.37 | 50.95 |
| 187 | 4.50 | 6.10 | 37.11 |
| Average | 4.18 | 6.06 | 45.06% |

In an alternate embodiment of the invention shown in FIG. 3, the rubber wrap 55 may be a two-piece molded unit whose seam overlap and are held together with non-metallic clamps 56 and 57. This embodiment speeds installation time and reduces the package size of the unit, but at additional cost.

Figure 9:
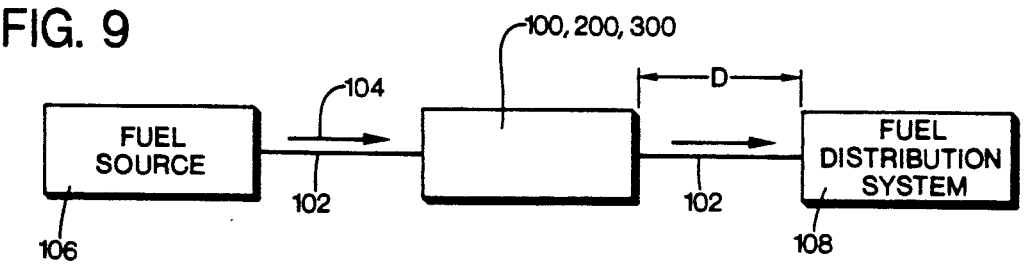
FIG. 9 is a schematic block diagram of a fuel conditioning apparatus of the present invention in use with an internal combustion engine and a fuel source.

Referring to FIGS. 5–8, an alternate form of a fuel conditioning apparatus or fuel conditioner 100 constructed in accordance with the present invention conditions and improves the utilization, emissions, and economy of fuel flowing through a fuel conveying or delivery means, such as a longitudinal portion of a fuel line 102. As shown in FIG. 9, the fuel flows in the direction indicated by arrows, such as arrow 104, from a fuel source 106 toward a fuel distribution system 108. The fuel source 106 may be a fuel pump filter, and the fuel distribution system 108 may be a carburetor for gasoline-powered engines, or a fuel injector into a cylinder for a diesel-powered engine. The fuel line 102, and the manner of coupling the fuel line to the fuel source 106 and fuel distribution system 108, may be as described above for the embodiment of FIGS. 2–4.

The fuel conditioner 100 may include two fuel conditioner assemblies, an upstream assembly 110 and a downstream assembly 112, relative to the direction of fuel flow shown by arrow 104. Each fuel conditioner assembly 110, 112 includes a magnet assembly 114 having at least one magnet 116 lying adjacent an exterior surface of the fuel line 102. In the illustrated embodiment, the magnet assembly 114 has a second magnet 118 which is oriented with respect to magnet 116 for a magnetic attraction therebetween.

Figure 5:
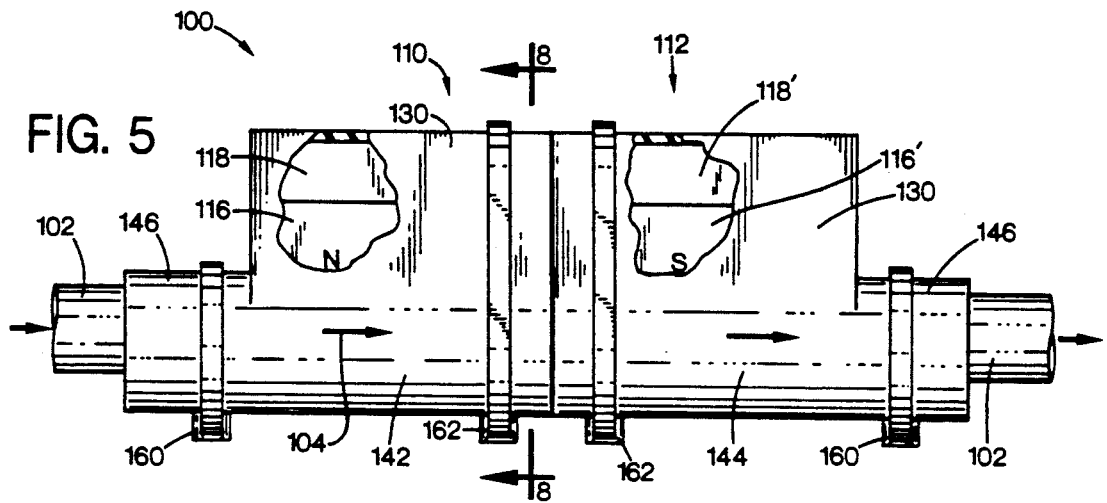
FIG. 5 is a partially cut away side elevation view of an alternate form of a fuel conditioning apparatus of the present invention.
Figure 6:
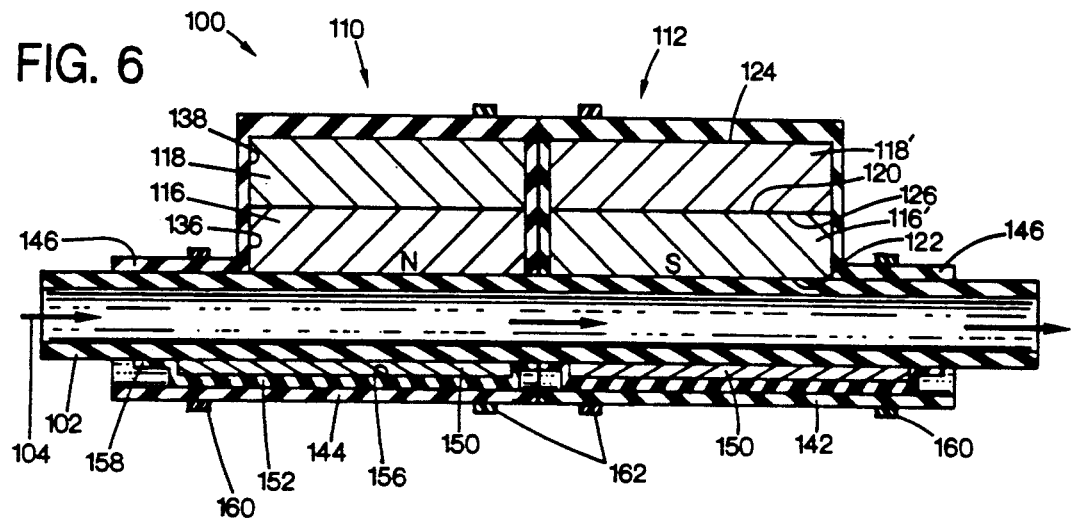
FIG. 6 is a longitudinal vertical sectional view of the apparatus of FIG. 5.
Figure 7:
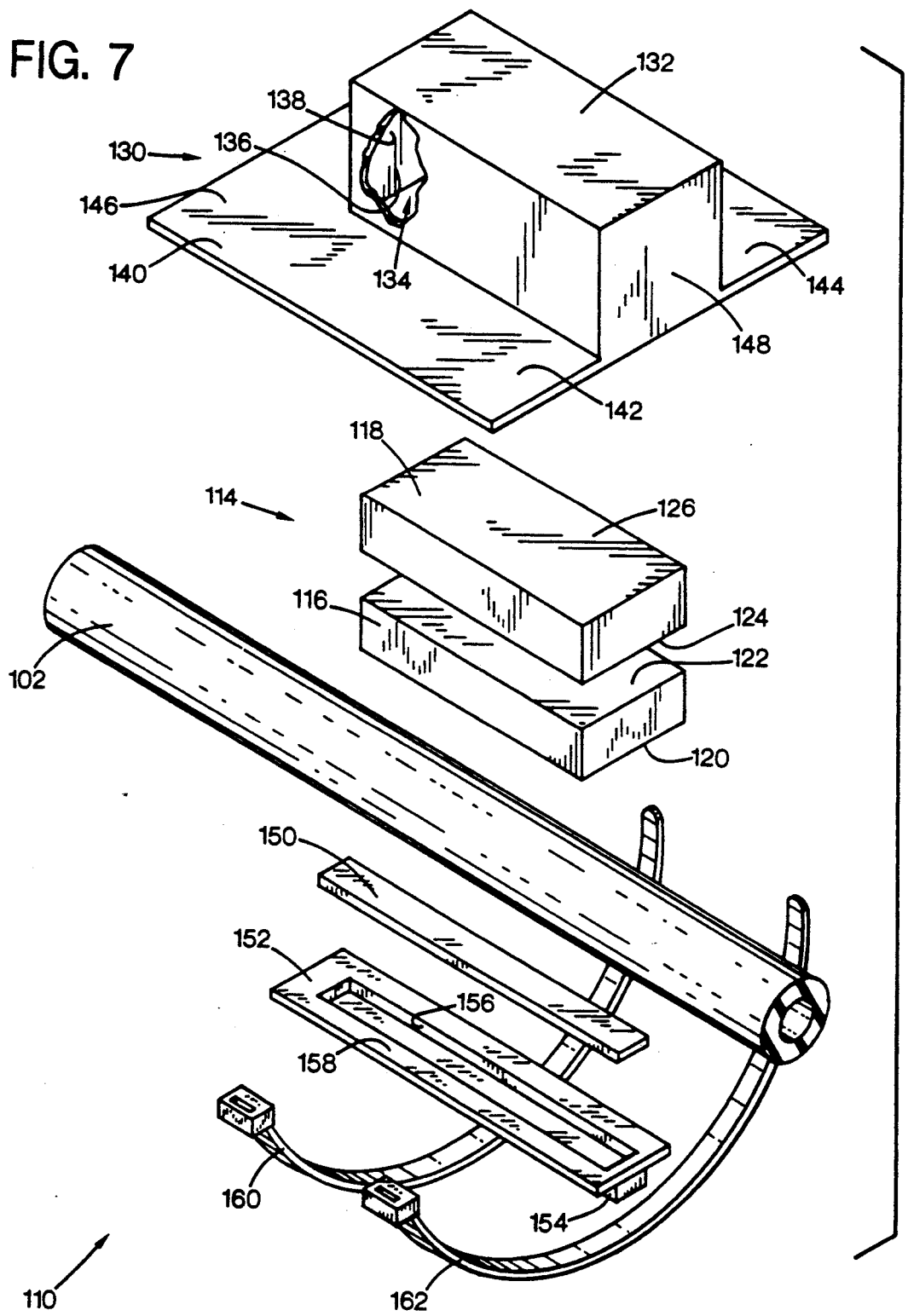
FIG. 7 is an exploded partially cut away perspective view of a portion of the apparatus of FIG. 5.

For example, referring to FIGS. 7 and 8, the magnet 116 has a north pole or north magnetic face 120 lying adjacent the exterior surface of fuel line 102. The magnet 116 has an opposing south pole or south magnetic face 122 which is in contact with a north pole or north magnetic face 124 of magnet 118. The magnet 118 also has a south pole or south magnetic face 126 facing away from the fuel line 102. As shown in FIGS. 5 and 6, the magnets of the fuel conditioner assembly 112 have a different orientation than the magnets of assembly 110. This different orientation is indicated by designating the magnets of assembly 112 as magnets 116' and 118'. The magnet 116' has the south magnetic face 122 lying adjacent the fuel line 102, while magnet 118' has the north magnetic face 124 facing away from the fuel line 102. The north magnetic face 120 of magnet 116' is aligned with the south magnetic face 126 of magnet 118'.

The magnets 116 and 118 are preferably porcelain or ceramic magnets, each having a 2,000 gauss magnetic charge. Such magnets may be obtained from Magnetic Specialties of Wood Village, Oreg. 97060, as part No. MCZ-C-35. It is preferred to use the magnets 116 and 118 without any coating or covering surrounding the magnet faces 120–126. Magnets with a plastic coating have proved to be inferior during use. Due to the heat within the engine compartment, such plastic coatings may melt when installed on some engines. Plastic coatings are also believed to decrease the flux produced by the magnets to one half of the rated gauss value. Thus, bare ceramic magnets 116 and 118 are preferred.

The fuel conditioning assemblies 110 and 112 each include shielding means, such as a rubber shield 130 for substantially surrounding and shielding the magnet assembly 114 and the fuel line 102. The rubber shield 130 also serves to shield a magnetic field induced by the magnet assembly 14 into fuel flowing through the fuel line 102 in the same manner as described above with respect to the embodiment of FIGS. 2–4. As best shown in FIG. 7, the rubber shield 130 may be a molded ⅛ inch thick rubber body including a magnet receiving portion 132 defining a magnet receiving cavity 134 therein. The cavity 134 includes an outer region 136 for receiving magnet 116, and an inner region 138 for receiving magnet 118.

The rubber shield 130 also includes a skirt portion 140 having legs 142 and 144 for extending around and surrounding the fuel line 102. The skirt portion 140 also has a longitudinally extending portion 146 for extending along a portion of the exterior surface of fuel line 102. The rubber shield 130 includes a flush face portion 148 which advantageously allows the shields 130 of the conditioner assemblies 110 and 112 to be positioned side-by-side in contact with one another, as shown in FIGS. 5 and 6. For some applications, it may be desirable to longitudinally separate the two fuel conditioning assemblies 110 and 112 from one another by a distance of less than one inch. In some applications, a separation distance (not shown) of ⅜ inch may provide optimal fuel economy. However, for the majority of applications, an abutting relationship between the two fuel conditioner assemblies 110 and 112 is believed to provide the best performance.

The fuel conditioner 100 also includes magnetic field focusing means, such as a focusing bar 150 of a ferrous steel, such as commercial grade, cold rolled 12-gauge steel, for instance, having a size of ¼ inch by 2½ inches. For example, the focusing bar may be of a low carbon steel, such as AISI (American Iron and Steel Institute) 1010 to 1018 series low carbon steel. The focusing bar 150 lies adjacent the exterior surface of fuel line 102 at a position substantially diametrically opposed from the magnet assembly 114. The focusing bar 150 is believed to concentrate the magnetic flux into the fuel flowing through line 102. The focusing bar also is believed to isolate the magnetic flux and substantially eliminate dissipation of the flux into the vehicle engine and chassis.

To aid in securing the focusing bar 150 in place, and to provide additional shielding, the fuel conditioner 100 also includes a focusing bar receiving member or retainer 152. The focusing bar retainer 152 includes a bar receiving portion 154 defining a cavity 156 sized to receive the focusing bar 150. The retainer 152 has a skirt portion 158 extending outwardly from the bar receiving portion 154. The skirt 158 lies against and frictionally grips the exterior surface of fuel line 102. As shown in FIG. 8, the leg portions 142 and 144 of the rubber shield 130 extend to surround at least a portion of the retainer 152. Note in FIG. 8, for clarity additional space has been left surrounding the fuel line 102. However, in practice, the legs 142 and 144 typically engage the exterior surface of the fuel line 102 and the retainer skirt 158.

The conditioner 100 has two pair of non-metallic tie straps, such as nylon tie straps 160 and 162, to secure the assemblies 110, 112 in place along the fuel line 102.

Referring to FIGS. 10 and 11, another alternate embodiment of a fuel conditioning apparatus or fuel conditioner 200 is shown installed on a fuel line 202 which may be as described above for FIG. 4. The fuel conditioner 200 is preferred for use with the heavier diesel-type fuels and more particularly for the larger diesel engines, such as those on the order of 5.8 liters in size, whereas the fuel conditioner 100 is preferred for gasoline-type fuels. The direction of flow of the diesel fuel through the conditioner 200 is illustrated by arrows, such as arrow 204. The conditioner 200 may be installed as shown in FIG. 9 between the fuel source 106 and the diesel engine fuel injectors 108.

The fuel conditioner 200 includes a pair of double fuel conditioner units, an upstream unit 210 and a downstream unit 212, relative to the direction of fuel flow shown by arrow 204. Each of the double conditioner units 210, 212 includes first and second fuel conditioner assemblies 214 and 216, with the assemblies for the downstream unit 212 shown as units 214' and 216'. The upstream conditioner assemblies 214 and 216 each have a magnet assembly 114 as described above, with the north magnetic faces 120 of magnets 116 lying adjacent an external surface of the fuel line 202 at substantially diametrically opposed locations. The downstream conditioner assemblies 214 and 216 each have a magnet assembly 114' as described above, with the south magnetic pole faces 122 of magnets 116' lying adjacent the exterior surface of fuel line 202 at substantially diametrically opposed locations.

Each of the fuel conditioner assemblies 214, 216, 214' and 216' includes shielding means, such as a rubber shield 220. The rubber shield 220 also serves to shield a magnetic field induced by the magnet assembly 14 into fuel flowing through the fuel line 202 as described above for the embodiments of FIGS. 2-4. The rubber shield 220 includes a magnet receiving portion 222 defining a magnet receiving cavity 224 having an outer region 226 sized to receive magnet 116 or 116', and an inner region 228 sized to receive magnet 118 or 118'.

The rubber shield 220 has a skirt portion 230 with an outboard longitudinally extending portion 232 and an inboard longitudinally extending portion 234. The skirt 230 also has first and second legs 236 and 238 for extending along the exterior surface of the fuel line 202. Referring to FIG. 11, the legs 236 and 238 are preferably of a length which allows the legs to overlap, shown as an overlap 240 of legs 236 and 238 of the diametrically opposing assemblies, such as assemblies 214 and 216. The magnet receiving portion 222 has an inboard exterior surface 242. As shown in FIG. 10, the skirt inboard portions 234 are sized so that when they are in abutment, the surfaces 242 of assemblies 214 and 214', as well as the surfaces 242 of assemblies 216 and 216', are separated from one another by a distance X. In the preferred embodiment, the distance X is substantially ⅜ inch.

To secure each double fuel conditioner unit 210, 212 to the fuel line 202, at least three non-metallic tie straps may be used, such nylon tie straps 250, 252 and 254, which may be as described above for straps 160, 162 or 32 and 34.

Referring to FIG. 12, another embodiment of a fuel conditioning apparatus or fuel conditioner 300 is shown which may be particularly useful for smaller horsepower diesel engines, such as those on the order 2.2 liters in size. The fuel conditioner 200 shown in FIGS. 10 and 11 above is believed to be more suitable for larger diesel engines, such as those appearing in semi-trucks or tractors. The fuel conditioner 300 may be considered a hybrid double fuel conditioner unit, having components from both the upstream unit 210 and the downstream unit 212 of the fuel conditioner 200. The fuel conditioner 300 includes a first fuel conditioner assembly 214' and a second fuel conditioner assembly 216 as described above with reference to FIGS. 10 and 11.

In the fuel conditioner 300, the south magnetic pole face 122 of magnet 116' lies along the exterior surface of fuel line 202 in a position substantially diametrically opposed to a north magnetic pole face 120 of magnet 116. Since only one double fuel conditioner unit is used for the conditioner 300, the longitudinally extending portions of the rubber shield skirt 230 are indicated as portions 232' and 234', as neither is inboard or outboard as described above for portions 234 and 232. Otherwise, the components shown for FIG. 12 are the same as those described above with reference to FIGS. 10 and 11.

Regarding the spacing between two side-by-side fuel conditioner assemblies, such as 110 and 112 which are in abutment, and 214 and 214' which are separated by a distance X, the performance tests have given varying results. Preliminary tests were made of the fuel conditioner 100 with a ⅜ inch spacing between the conditioner assemblies 110 and 112, rather than the abutting relationship shown in FIGS. 5 and 6. These preliminary tests showed that a spacing of ⅜ inches to one inch apart yielded what was believed to be an optimal 1700 gauss magnetic field strength in a keyway portion of the fuel line located between the two spaced-apart assemblies, such as a keyway portion 302 shown for conditioner 200 in FIG. 10. In these preliminary tests, the strength of the magnetic field in the fuel line under each of the magnet assemblies was 1100 gauss, which was enhanced to the 1700 gauss reading in the keyway portion of the fuel line. Thus, a 1700 gauss magnetic field strength was then believed to result in optimal fuel economy and was obtainable with the ⅜ inch spacing between the conditioner assemblies. In a later follow-up test, a 1700 gauss magnetic field strength, which is still believed to result in optimal fuel economy, was only obtainable with the two conditioner assemblies 110 and 112 in an abutting relationship as shown in FIGS. 5 and 6.

Others in the art, such as Chow mentioned above, overcharge the fuel by placing a magnet assembly as close as possible to the carburetor. As shown in FIG. 9, it is believed that optimal performance of the fuel conditioner 100, 200 or 300 may be obtained by locating the fuel conditioner a pre-selected fuel conditioning distance D from the fuel distribution system 108. It is believed a fuel conditioning distance D of eighteen inches maximizes the fuel mileage and minimizes the fuel emissions of a vehicle equipped with the conditioner. Both time and distance are believed to be required to realize the full effect of the ionization or polarization phenomenon caused by the magnetic field produced by the fuel conditioner. During this conditioning time, it is believed that this polarization phenomenon allows a match-up or mating of the available oxygen in the fuel, to promote more complete fuel combustion.

Regarding the decreased fuel emissions, very unexpected results were obtained when vehicles equipped with the conditioner 100 were tested by state vehicle emission test facilities. A fuel conditioner 100 was installed as described above on a 1982 Dodge pick-up truck having a gross vehicle weight of 5300 pounds, and a six cylinder, 225 cubic inch engine burning conventional "regular" unleaded gasoline. During a standard state of California smog check inspection, the emissions were virtually nil, as shown in the emission test results Table 3 below.

TABLE 3

| Emission Test Results | | |
|---|---|---|
| | Maximum Allowed | Measured Result |
| 2500 RPM Test Results | | |
| HC (ppm) | 220 | 0.14 |

TABLE 3-continued

| Emission Test Results | | |
|---|---|---|
| | Maximum Allowed | Measured Result |
| CO (%) | 1.2 | 0.00 |
| Engine RPM: | 2619 | |
| Idle Test Results | | |
| HC (ppm) | 150 | 0.13 |
| CO (%) | 1.2 | 0.00 |
| Engine RPM: | 738 | |

The hydrocarbon emissions in parts per million (ppm) were less than 0.01% of the maximum allowed during the idle test, and less than 0.001% of the maximum allowed during the 2500 rpm test. The carbon monoxide was 0.00% in each test. Furthermore, the test vehicle had no catalytic converter. The test technician was so surprised by these results that a fuel sample was taken to verify the use of regular unleaded gasoline.

A similar test was conducted in the state of Oregon on a 1989 GMC puck-up truck having the fuel conditioner 100 installed as described above. Once again, the carbon monoxide at both idle and 2500 rpm was zero percent. The hydrocarbons at an engine idle of 900 rpm were 0.10 ppm, and ranged from 0.15 to 0.25 ppm at 2500 rpm. Thus, it is believed that these emissions are superior, not only over conventional gasoline engines, but also over the emissions obtainable for natural gas-powered vehicles.

Tables 4 and 5 show the test results and the resulting improved fuel mileage for several selected passenger cars and diesel semi-trucks, respectively.

TABLE 4

| Type of Car | Baseline | With Unit | Increase |
|---|---|---|---|
| 1983 Cadillac Fleetwood | 19 | 34 | 79% |
| 1990 Honda Civic (4 cylinder) (fuel injection) | 31 | 49 | 58% |
| 1989 Honda Station Wagon (4 cylinder) (carburetor) | 30 | 51 | 70% |
| 1987 Dodge Caravan (4 cylinder) (Mitsubishi) | 26 | 40 | 54% |
| 1986 Chrysler New Yorker (4 cylinder) (Mitsubishi) | 26 | 42 | 62% |

TABLE 5

| Diesel Over the Road Tractor-Trailer | | | |
|---|---|---|---|
| Tractor Number | Without Unit MPG | With Conditioner MPG | Increase in MPG |
| 71 | 3.52 | 4.92 | 39.8% |
| 82 | 5.00 | 7.28 | 45.6% |
| 142 | 3.79 | 5.49 | 44.9% |
| 180 | 4.06 | 6.22 | 53.2% |
| 184 | 4.22 | 6.37 | 51.0% |
| 187 | 4.50 | 6.10 | 35.6% |
| Average: | 4.18 | 6.06 | 45.3% |

As mentioned briefly above, due to the heavier nature of diesel fuel, the two double fuel conditioning units 210 and 212 were used for the fuel conditioner 200 on the diesel semi-trucks in Table 5 above. The fuel conditioner 100 was used on the passenger cars for the test results shown in Table 4 above. In both Tables 4 and 5, it is apparent that significant increases were obtained in the miles per gallon utilization of the fuel.

Figure 13:
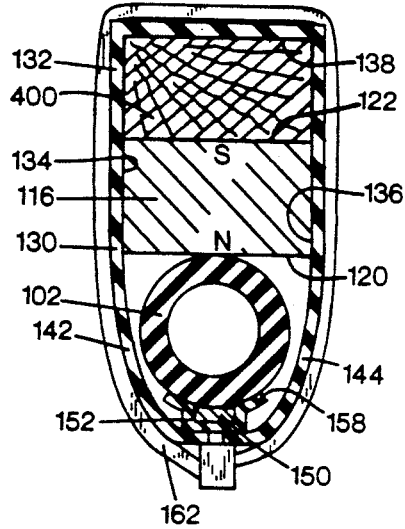
FIGS. 13 and 14 are vertical cross-sectional views of alternate embodiments of the apparatuses shown in FIGS. 5 and 10, respectively.
Figure 14:
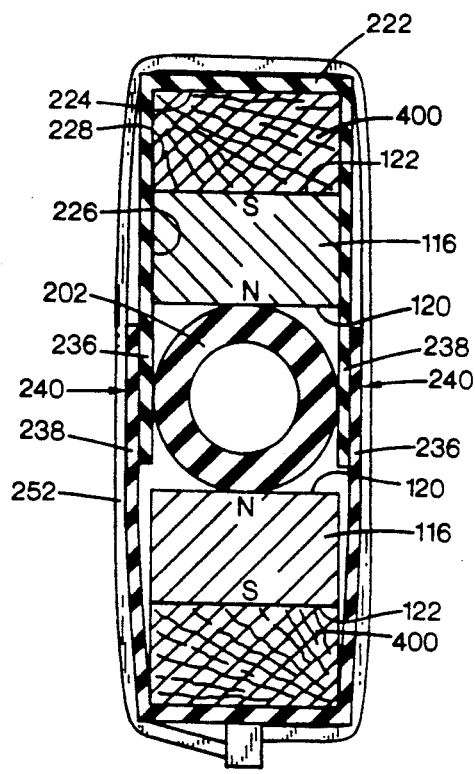
Figure 15:
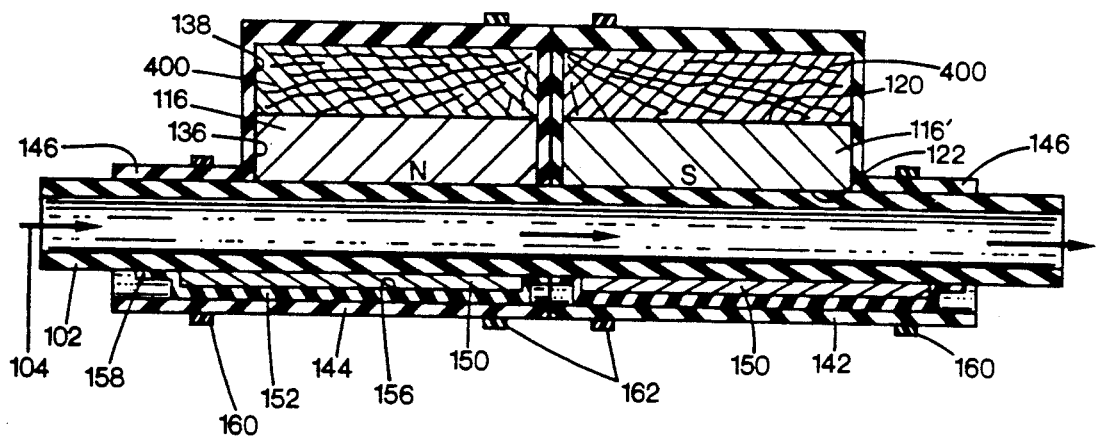
FIG. 15 is a longitudinal vertical sectional view of an alternate embodiment of the apparatus shown in FIG. 6.

As mentioned briefly above, overcharging of the fuel with too great of a magnetic force is believed to decrease the efficiency of fuel use by the engine. Thus, for smaller sized engines, the magnetic field is preferably decreased. This can be done in several ways using the embodiments described above. For example, magnets having a lower gauss rating may be used in place of the 2,000 gauss magnets described above. Alternatively, as shown in FIGS. 13 and 14, a magnetically inert spacer 400 may be inserted within the rubber shield cavity in place of magnets 118 and 118', while otherwise, the components of FIGS. 13 and 14 may be as described above for FIGS. 8 and 11, respectively. One preferred material for the inert magnetic spacer is wood, as shown in FIGS. 13 and 14. For example as shown in FIG. 15, for smaller two-, three- and four-cylinder engines, on the order of 600 cc in size, such as may be found in small cars or motorcycles, the magnets 118 and 118' of conditioner 100 may be replaced with wooden blocks 400, while using magnets 116 and 116' rated at 2,000 gauss. In this configuration, the fuel flowing through the longitudinal portion of the fuel line 102 beneath the assemblies 110 and 112 experiences a magnetic field of approximately 700 gauss.

To decrease the magnetic field for smaller diesel engines, for example, 2.2 liters in size, the fuel conditioner 300 is preferred over fuel conditioner 200. When constructed with 2,000 gauss magnets 116, 118, 116' and 118', the conditioner 200 induces a 2400 gauss magnetic field in the fuel traveling between the assemblies 214' and 216.

Having illustrated and described the principles of my invention with respect to the preferred embodiments, it should be apparent to those skilled in the art that my invention may be modified in arrangement and detail without departing from such principles. I claim all such modifications falling within the scope and spirit of the following claims.

I claim:

1. A fuel conditioning apparatus for attaching to a fuel line conveying fuel from a fuel source to a fuel distribution system of an internal combustion engine, comprising:
   a magnet assembly comprising at least one magnet lying adjacent a longitudinal portion of the fuel line to provide a magnetic field about the fuel line;
   a rubber shield substantially surrounding the magnet assembly and the longitudinal portion of the fuel line to shield the magnet assembly and a magnetic field induced in fuel flowing in the longitudinal portion of the fuel line;
   a focusing bar of ferrous steel lying adjacent the longitudinal portion of the fuel line in a substantially diametrically opposed portion from the magnet assembly; and
   the rubber shield substantially surrounds the focusing bar.

2. A fuel conditioning apparatus according to claim 1 wherein:
   the fuel conditioning apparatus further includes a focusing bar receiving member defining a cavity within which the focusing bar is received; and
   the rubber shield substantially surrounds the focusing bar receiving member.

3. A fuel conditioning apparatus according to claim 1 wherein the magnet assembly is located a preselected conditioning distance from the fuel distribution system.

4. A fuel conditioning apparatus according to claim 3 wherein the preselected conditioning distance is about eighteen inches.

5. A fuel conditioning apparatus for attaching to a fuel line conveying fuel from a fuel source to a fuel distribution system of an internal combustion engine, comprising:
   a magnet assembly comprising at least one magnet lying adjacent a longitudinal portion of the fuel line to provide a magnetic field about the fuel line; and
   a rubber shield substantially surrounding the magnet assembly and the longitudinal portion of the fuel line to shield the magnet assembly and a magnetic field induced in fuel flowing in the longitudinal portion of the fuel line, wherein the rubber shield is a molded rubber member defining a cavity which receives the magnet assembly, the cavity having an inner region and an outer region.

6. A fuel conditioning apparatus according to claim 5 wherein the magnet assembly includes first and second magnets, with the first magnet received within the cavity inner region and the second magnet received within the cavity outer region to lie adjacent the longitudinal portion of the fuel line.

7. A fuel conditioning apparatus according to claim 5 wherein:
   the fuel conditioning apparatus further includes a magnetically inert spacer received within the cavity inner region; and
   the magnet assembly comprises a single magnet received within the cavity outer region to lie adjacent the longitudinal portion of the fuel line.

8. A fuel conditioning apparatus according to claim 7 wherein the magnetically inert spacer comprises a wooden block.

9. A fuel conditioning apparatus for attaching to a fuel line conveying fuel from a fuel source to a fuel distribution system of an internal combustion engine, comprising:
   a first pair of magnet assemblies with each magnet assembly comprising at least one magnet lying adjacent and in contact with a longitudinal portion of the fuel line to provide a magnetic field about the fuel line, wherein said first pair of magnet assemblies are longitudinally aligned adjacent the longitudinal portion of the fuel line, with the magnet of the magnet assembly located toward the fuel source having a north pole lying adjacent the fuel line, and the magnet of the magnet assembly located toward the fuel distribution system having a south pole lying adjacent the fuel line; and
   a rubber shield substantially surrounding the pair of magnet assemblies and the longitudinal portion of the fuel line to shield the pair of magnet assemblies and a magnetic field induced in fuel flowing in the longitudinal portion of the fuel line.

10. A fuel conditioning apparatus according to claim 9 wherein:
    the fuel conditioning apparatus further includes a pair of focusing bars of ferrous steel, each lying adjacent the longitudinal portion of the fuel line, with one focusing bar in a substantially diametrically opposed position from one magnet assembly, and the other focusing bar in a substantially diametrically opposed position from the other magnet assembly; and the rubber shield substantially surrounds the pair of focusing bars.

11. A fuel conditioning apparatus according to claim 10 further including a third magnet assembly located substantially diametrically opposed to one of said first pair of magnet assemblies to sandwich the longitudinal portion of the fuel line therebetween with pole faces of said diametrically opposed magnet assemblies of a first polarity lying adjacent the fuel line.

12. A fuel conditioning apparatus according to claim 9 wherein:

said longitudinal portion of the fuel line comprises first and second portions;

said first pair of magnet assemblies comprises a first magnet assembly including at least one magnet adjacent the first portion of the fuel line, and a second magnet assembly including at least one magnet adjacent the second portion of the fuel line; and the fuel conditioning apparatus further includes a second pair of magnet assemblies substantially diametrically opposed to said first pair of magnet assemblies sandwich the first and second longitudinal portions of the fuel line therebetween, with the magnet assemblies located toward the fuel source each having a north pole lying adjacent the fuel line, and the magnet assemblies located toward the fuel distribution system each having a south pole lying adjacent the fuel line.

13. A fuel conditioning apparatus according to claim 12 wherein each of the magnet assemblies of the two pairs of magnetic assemblies are separated by a distance of about three quarters of an inch along the longitudinal portion of the fuel line.

14. A fuel conditioning apparatus for attaching to a fuel line conveying fuel from a fuel source to a fuel distribution system of an internal combustion engine, comprising:

a pair of magnet assemblies with each magnet assembly comprising at least one magnet lying adjacent a longitudinal portion of the fuel line to provide a magnetic field about the fuel line; and a rubber shield substantially surrounding the pair of magnet assemblies and the longitudinal portion of the fuel line to shield the pair of magnet assemblies and a magnetic field induced in fuel flowing in the longitudinal portion of the fuel line, wherein the rubber shield comprises two molded rubber members each defining a cavity which receives one magnet assembly, the cavity having an inner region and an outer region.

15. A fuel conditioning apparatus according to claim 14 wherein each magnet assembly includes first and second magnets, with the first magnet received within the cavity inner region and the second magnet received within the cavity outer region to lie adjacent the longitudinal portion of the fuel line.

16. A fuel conditioning apparatus according to claim 14 wherein:

the fuel conditioning apparatus further includes a pair of magnetically inert spacers, with one spacer received within the cavity inner region for each molded rubber member; and each magnet assembly comprises a single magnet received within the cavity outer region to lie adjacent the longitudinal portion of the fuel line.

17. A method of conditioning fuel for an internal combustion engine, comprising the steps of:

conveying fuel through a fuel line from a fuel source to a fuel distribution system of the internal combustion engine;

during the conveying step, first inducing a north pole polarity magnetic field in the fuel;

during the conveying step and after the first inducing step, then, second, inducing a south pole polarity magnetic field in the fuel;

during at least one of the first and second inducing steps, focusing the induced magnetic field with a focusing device of ferrous steel located adjacent the fuel line;

shielding the fuel line with a rubber shield during the first and second inducing steps; and during the conveying step and after the second inducing step, allowing the fuel to continue to flow through the fuel line over a preselected conditioning distance to the fuel distribution system.

18. A method of conditioning fuel according to claim 17 wherein:

the first inducing step comprises inducing the north pole polarity magnetic field in the fuel from a single side of the fuel line; and the second inducing step comprises inducing the south pole polarity magnetic field in the fuel from the single side of the fuel line.

19. A method of conditioning fuel according to claim 18 wherein:

the first inducing step includes the step of focusing the north pole polarity magnetic field from a side opposite the single side of the fuel line; and the second inducing step comprises the step of focusing the south pole polarity magnetic field from a side opposite the single side of the fuel line.

20. A method of conditioning fuel according to claim 17 wherein:

the first inducing step comprises inducing the north pole polarity magnetic field in the fuel from diametrically opposed sides of the fuel line; and the second inducing step comprises inducing the south pole polarity magnetic field in the fuel from the diametrically opposed sides of the fuel line.

* * * * *